United States Patent
Stojkovic et al.

(10) Patent No.: US 10,814,772 B2
(45) Date of Patent: Oct. 27, 2020

(54) ROPE TIE DOWN APPARATUS

(71) Applicant: Ford Global Technologies, LLC, Dearborn, MI (US)

(72) Inventors: Dragan B. Stojkovic, Taylor, MI (US); Joshua R. Hemphill, White Lake, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/239,926

(22) Filed: Jan. 4, 2019

(65) Prior Publication Data
US 2019/0135162 A1 May 9, 2019

Related U.S. Application Data

(62) Division of application No. 15/634,960, filed on Jun. 27, 2017, now Pat. No. 10,183,609, which is a division of application No. 15/064,081, filed on Mar. 8, 2016, now Pat. No. 9,707,883.

(51) Int. Cl.
*B60P 7/08* (2006.01)

(52) U.S. Cl.
CPC .................. *B60P 7/0807* (2013.01)

(58) Field of Classification Search
CPC ................. B60P 7/0807; B60P 7/08
USPC ............... 410/101, 102, 106, 107, 111, 116
See application file for complete search history.

(56) References Cited

U.S. PATENT DOCUMENTS

| | | | |
|---|---|---|---|
| 2,309,666 A | 2/1943 | Parker | |
| 3,125,058 A | 3/1964 | Peterson | |
| 4,174,119 A | 11/1979 | Biles | |
| 4,541,149 A | 9/1985 | Jensen | |
| 4,850,770 A | 7/1989 | Millar, Jr. | |
| 4,987,845 A * | 1/1991 | Camarota | B63B 35/816 114/218 |
| 5,443,341 A | 8/1995 | Hamilton | |
| 5,445,482 A | 8/1995 | Davis | |
| 5,920,963 A | 7/1999 | Chou | |
| 5,987,711 A | 11/1999 | Parsons | |
| 6,039,520 A | 3/2000 | Cheng | |
| 6,618,912 B1 | 9/2003 | Chang | |
| 6,953,312 B1 | 10/2005 | Wheatley | |
| 7,337,504 B1 | 3/2008 | Casey | |
| 8,529,176 B2 | 9/2013 | Jutila et al. | |

(Continued)

FOREIGN PATENT DOCUMENTS

CN 101765728 6/2010
CN 102525039 7/2012

*Primary Examiner* — Stephen T Gordon
(74) *Attorney, Agent, or Firm* — David Coppiellie; Brooks Kushman P.C.

(57) ABSTRACT

A tie-down apparatus is disclosed for a pick-up truck bed that includes a cleat having a base portion adapted to be attached to the pick-up truck bed and a loop portion defining an opening for receiving an elongated strand threaded through the opening. A neck portion is provided between the base portion and the loop portion that is adapted to be wrapped by the strand. A hook-shaped flange has a first portion extending normal relative to the loop portion and a second portion partially overlying and spaced from the loop portion. Teeth may be provided on the loop portion directly or on two triangular protrusions. A clamping jaw may also be used to positively grip the strand.

5 Claims, 3 Drawing Sheets

(56) References Cited

U.S. PATENT DOCUMENTS

| | | |
|---|---|---|
| 9,038,247 B2 | 5/2015 | Dodge |
| 9,707,883 B1 * | 7/2017 | Stojkovic .............. B60P 7/0807 |
| 9,884,578 B2 | 2/2018 | Stojkovic et al. |
| 10,183,609 B2 * | 1/2019 | Stojkovic .............. B60P 7/0807 |
| 2002/0168242 A1 | 11/2002 | Lin |
| 2009/0260195 A1 | 10/2009 | Howard |

* cited by examiner

ROPE TIE DOWN APPARATUS

REFERENCE TO RELATED APPLICATIONS

This application is a division of U.S. application Ser. No. 15/634,960 filed Jun. 27, 2017, now U.S. Pat. No. 10,183,609 issued Jan. 22, 2019, which is a division of U.S. application Ser. No. 15/064,081 filed Mar. 8, 2016, now U.S. Pat. No. 9,707,883 issued Jul. 18, 2017, the disclosures of which are hereby incorporated in their entirety by reference herein.

TECHNICAL FIELD

This disclosure relates to pick-up truck bed tie-down apparatus that are adapted to be wrapped by a rope to secure cargo.

BACKGROUND

Pick-up trucks are favored by consumers due to the cargo carrying capabilities and flexibility afforded by the pick-up truck bed. A wide variety of different types of cargo may be conveniently transported in the bed. Different types of cargo may be secured with different specialized straps with hooks, bungee cords with hooks, tie downs with ratchet tighteners, and the like. Some types of cargo may be tied down with a rope.

Ropes are readily available and may be cut to size but normally it is not desirable to cut a rope because a shorter rope may be less useful than a longer rope. Using a rope to tie down cargo to a loop or ring may necessitate threading the rope through the ring and tightening the rope at each tie down location. To securely tie down some types of cargo with a rope, it may be necessary to tie the rope down by threading a rope through each loop may be time-consuming. At each tie-down location the rope must be pulled until the rope is tight or the cargo could shift in transit.

This disclosure is directed to solving the above problems and other problems as summarized below.

SUMMARY

According to one aspect of this disclosure, a tie-down apparatus is disclosed for a pick-up truck bed. The tie-down apparatus includes a cleat including a base portion adapted to be attached to the pick-up truck bed. A loop portion defining an opening for receiving an elongated strand threaded through the opening. A hook-shaped flange that has a first portion extending normal relative to the loop portion and a second portion partially overlying and spaced from the loop portion.

According to other aspects of this disclosure, the base portion may define a plurality of fastener receiving holes in a planar area of the base portion that includes a mounting surface that is adapted to be mounted flush to one of a wall and floor of the pick-up truck bed. The loop portion may extend at an oblique angle relative to the base portion and may be spaced at a distal end from the pick-up truck bed when the apparatus is attached to the pick-up truck bed. The hook-shaped flange may define an open end through which an intermediate section of the elongated strand is receivable perpendicularly relative to a length of the elongated strand. A neck portion is provided between the base portion and the loop portion that is adapted to be wrapped by the elongated strand instead of threading the strand through the opening in the loop portion.

According to another aspect of this disclosure, a tie-down apparatus is disclosed for pick-up truck bed. The apparatus comprises a cleat including a base portion adapted to be attached to the pick-up truck bed. A loop portion defining an opening for receiving an elongated strand threaded through the opening. A gripper provided on a distal end of the loop portion that defines a concave rope receptacle. A plurality of teeth is provided in the receptacle to facilitate holding the rope.

According to other aspects of this disclosure, concave receptacle may be formed by two protrusions that extend from one side of the loop portion and each of the protrusions include a wall that includes the teeth, and wherein the wall of each protrusion defines a V-shaped recess with the wall of the other protrusion. The loop portion may extend at an oblique angle relative to the base portion and may be spaced at a distal end from the pick-up truck bed when the apparatus is attached to the pick-up truck bed. The two protrusions may be provided on the side of the loop portion that faces the pick-up truck bed. The concave rope receptacle may be formed by two triangular protrusions that extend from one side of the loop portion and each of the triangular protrusions may include a wall that includes some of the plurality of teeth. The wall of each protrusion may define a V-shaped recess with the wall of the other protrusion.

According to a further aspect of this disclosure, a tie-down apparatus is disclosed for pick-up truck bed. The tie-down apparatus includes a cleat having a base portion adapted to be attached to the pick-up truck bed and a loop portion defining an opening for receiving an elongated strand threaded through the opening. A gripper is provided on a distal end of the loop portion and a plurality of teeth is provided on at least one side of the loop portion to facilitate holding the elongated strand.

According to further aspects of this disclosure the loop portion may extend at an oblique angle relative to the base portion and may be spaced at a distal end from the pick-up truck bed when the apparatus is attached to the pick-up truck bed.

According to yet another aspect of this disclosure, a tie-down assembly is disclosed for pick-up truck bed that comprises a cleat and a clamping jaw. The cleat includes a base adapted to be attached to the pick-up truck bed and a loop defining an opening for receiving an elongated strand threaded through the opening. The clamping jaw is pivotally attached to the loop with an openable end of the clamping jaw being adapted to clamp the elongated strand against a distal end of the loop.

According to other aspects of this disclosure relating to the tie-down assembly, a plurality of teeth may be provided on the distal end of the loop. A second plurality of teeth may be provided on the openable end of the clamping jaw so that the plurality of teeth on the distal end of the loop and the second plurality of teeth on the loop are adapted to engage opposite sides of the elongated strand. In addition, a spring may be operatively connected between the loop and the clamping jaw to bias the openable end of the clamping jaw into engagement with the distal end of the loop. A trigger end may be provided on an opposite end of the clamping jaw from the openable end of the clamping jaw, wherein the trigger end is manually manipulated to open the openable end of the clamping jaw. The loop may be attached by a neck portion to the base, the clamping jaw may be connected to the neck portion by a pivot pin, and the clamping jaw may extend across the opening defined by the loop.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
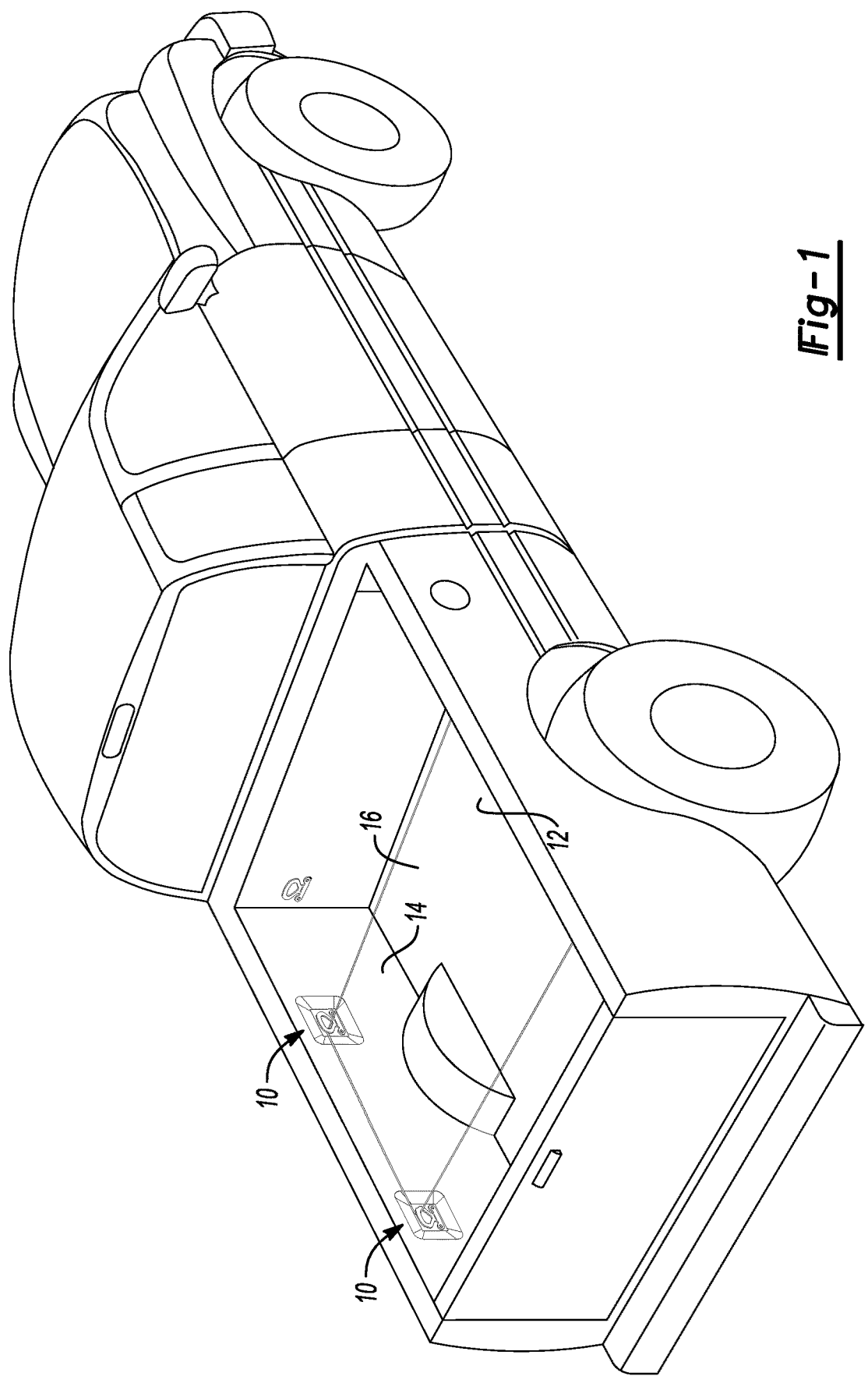
FIG. 1 is a perspective view of a pick-up truck provided with one embodiment of the disclosed tie-down apparatus.

Referring to FIG. 1, several tie-down apparatus 10 are shown to be installed in a pick-up truck bed 12. The pick-up truck bed 12 includes walls 14 and a floor 16. The cleats 18 provide convenient locations to tie down cargo (not shown) with an elongated strand 24, such as a rope, cable, wire, strap or the like.

Figure 2:
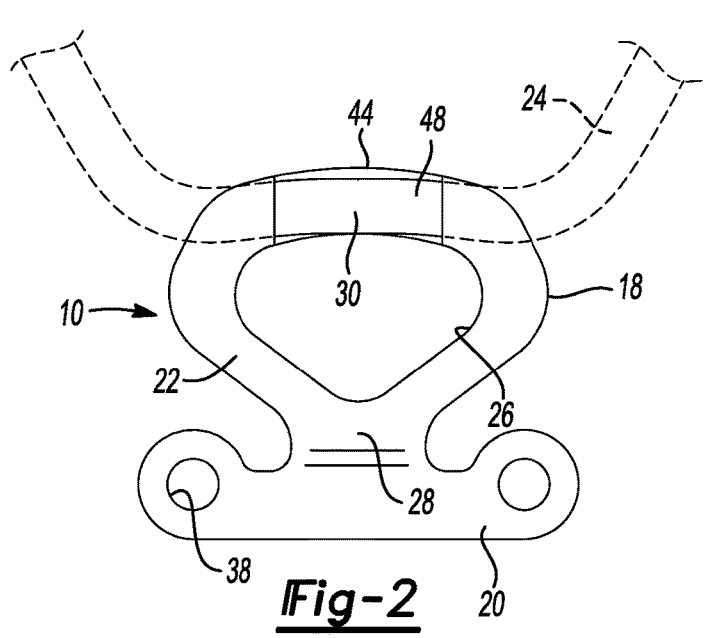
FIG. 2 is a front elevation view of a first embodiment of a tie-down apparatus with a rope entrained thereon.
Figure 3A:
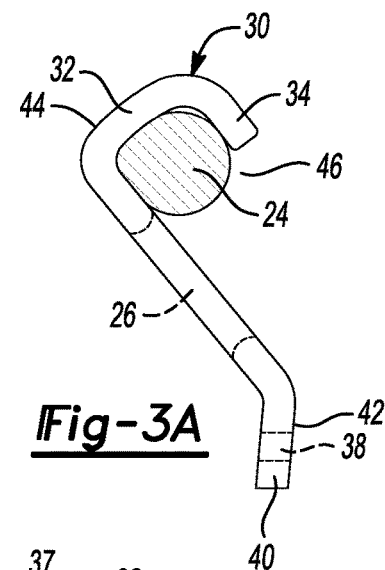
FIG. 3A is a side elevation view of the tie-down apparatus shown in FIG. 2.

Referring to FIGS. 2 and 3A, the cleat 18 of the tie-down apparatus 10 is illustrated in greater detail. The cleat 18 includes a base portion 20 and a loop portion 22. The elongated strand 24 may be threaded through an opening 26 defined by the loop portion 22. Alternatively, a neck portion 28 is provided between the base portion 20 and the loop portion 22. The strand 24 may be wrapped over the neck portion 28 if it would be easier than threading the strand through the opening 22. The tie-down apparatus 10 also includes a hook-shaped flange 30 through which the rope 24 may be routed. The hook-shaped flange 30 includes a first portion that extends normal to the loop portion 22 and a second portion 34 that extends from the first portion 32 to overlie a part of the loop portion 22.

Figure 3B:
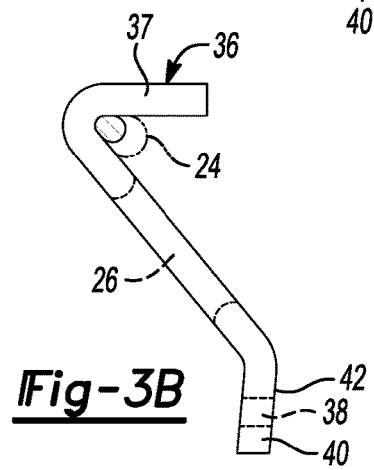
FIG. 3B is a side elevation view of an alternative embodiment of a tie-down apparatus.

Referring to FIG. 3B, an alternative embodiment of a tie-down apparatus is illustrated that includes a V-shaped hook 36 that the rope 24 may be hooked. The V-shaped hook 36 includes a flange 37 that extends at an acute angle relative to the loop portion 22 and may accommodate ropes 24 having different thicknesses.

The base portion 20 defines a plurality of fastener receiving holes 38 in a planar area 40 of the base portion 20. A mounting surface 42 on the planar area 40 is adapted to engage the wall 14 or floor 16 of the pick-up truck bed 12 (shown in FIG. 1).

A distal end 44 of the loop portion 22 is spaced from the wall 14 or floor 16 of the pick-up truck bed 12. The hooked-shaped flange 30 defines an open end 46 through which an intermediate section 48 of the elongated strand 24 or rope may be secured to tie-down cargo without having to thread the rope 24 through the opening 26 defined by the loop portion 22.

Figure 4:
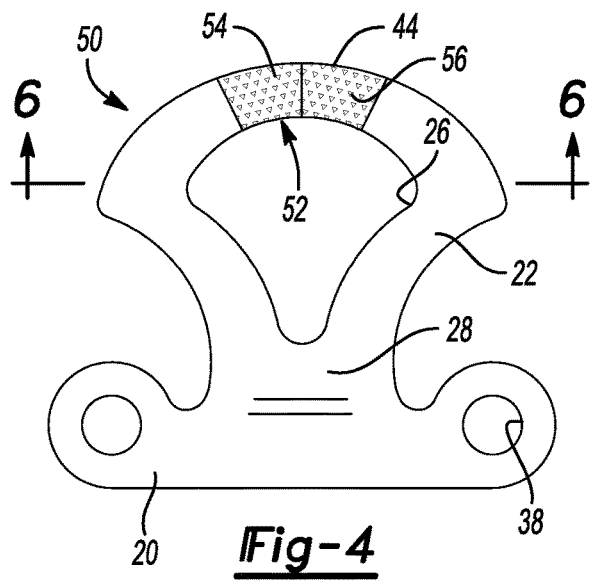
FIG. 4 is a front elevation view of a second embodiment of a tie-down apparatus having rope engaging teeth provided on triangular protrusions on a distal end of a loop portion.
Figure 6:
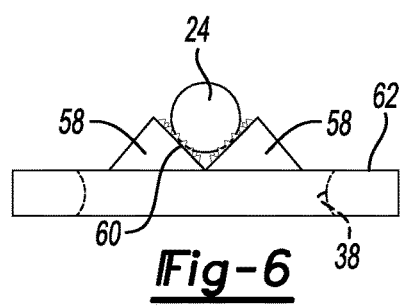
FIG. 6 is a diagrammatic view of the tie-down apparatus taken from the line 6-6 in FIG. 4.
Figure 5:
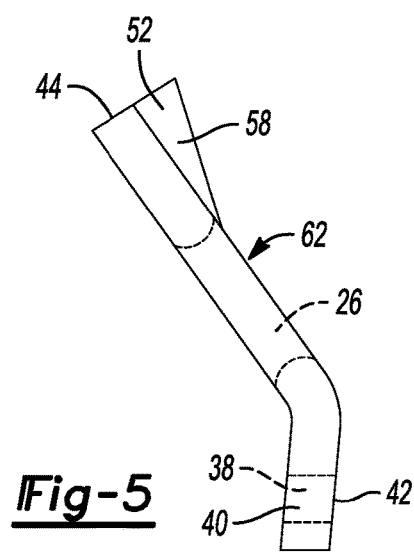
FIG. 5 is a side elevation view of the tie-down apparatus shown in FIG. 4.

Referring to FIGS. 4-6, an alternative embodiment of a tie-down apparatus 50 is illustrated. Similar parts of the tie-down apparatus to that disclosed with reference to FIGS. 2 and 3 are referred to with the same reference numerals used to designate similar portions of the embodiment illustrated in FIGS. 4-6. The tie-down apparatus 50 includes the base portion 20 and loop portion 22, as previously described. The base portion 20 is secured to a pick-up truck bed 12 by fasteners inserted through the fastener holes 38. The loop portion 22 defines the opening 26 through which the elongated strand 24 may be threaded. The neck portion 28 is adapted to be wrapped by the strand 24 as previously described.

At the distal end 44 of the loop portion 22, a gripper 52 is provided that grips the elongated strand 24 (shown in FIG. 6) when threaded through the opening 26. The gripper 52 includes a concave rope receptacle 54 and may also be referred to as a V-shaped recess. A plurality of teeth 56 are provided in the V-shaped recess, or concave rope receptacle 54. The teeth 56 are preferably provided on a pair of triangular protrusions 58 that protrude from the side of the loop portion 22 facing the pick-up truck bed 12. The triangular protrusions 58 each include a wall 60 on which the teeth 56 are provided. The triangular protrusions 58 extend from one side 62 that faces the pick-up truck bed 12 (as shown in FIG. 1). In the embodiment of FIGS. 4-6, the strand 24 is threaded through the opening 26 in the loop portion 22. After the rope is threaded through the opening 26, the rope may be held against the teeth 56 to maintain tension applied to the strand 24.

Figure 7:
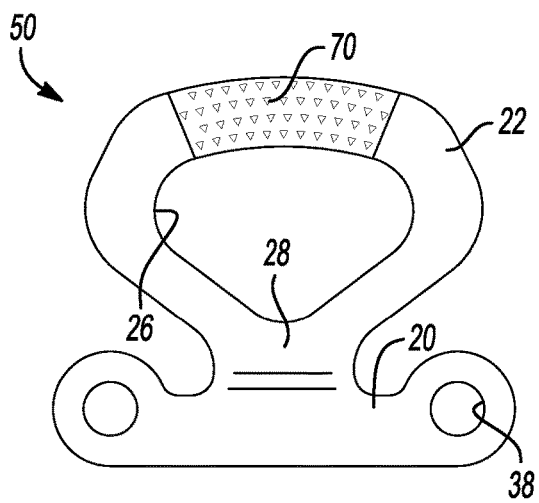
FIG. 7 is a front elevation view of a third embodiment of a tie-down apparatus having rope engaging teeth provided on a distal end of a loop portion.
Figure 8:
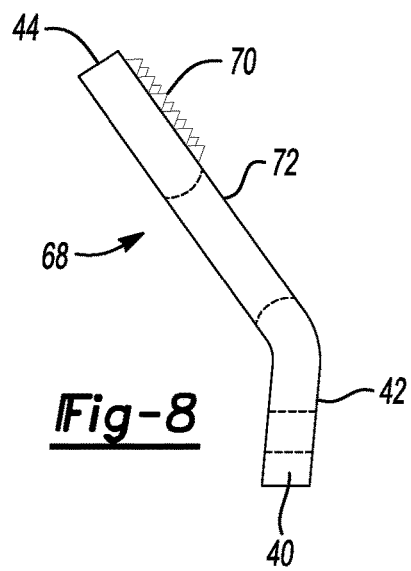
FIG. 8 is a side elevation view of the tie-down apparatus shown in FIG. 7.

Referring to FIGS. 7 and 8, another alternative embodiment 68 is shown wherein a base portion 20 and loop portion 22 that defines the opening 26 is illustrated. The tie-down apparatus 68 is secured by fasteners received through the fastener openings 38 defined by the base 20. A plurality of teeth 70 are provided on the side 72 of the loop portion 22 that face the pick-up truck bed shown in FIG. 1. In the embodiment illustrated in FIGS. 7 and 8, the teeth 70 are provided directly on the loop portion 22 at the distal end 44 of the loop portion 22. Similar to the embodiment of FIGS. 4-6, the teeth 70 are adapted to engage the strand 24 (shown in FIG. 6) after it is threaded through the opening 26 defined by the loop portion 22. After the rope is threaded through the opening 26, tension may be applied to the strand 24 to maintain tension. Alternatively, the strand 24 may be wrapped onto the neck portion 28.

Figure 9:
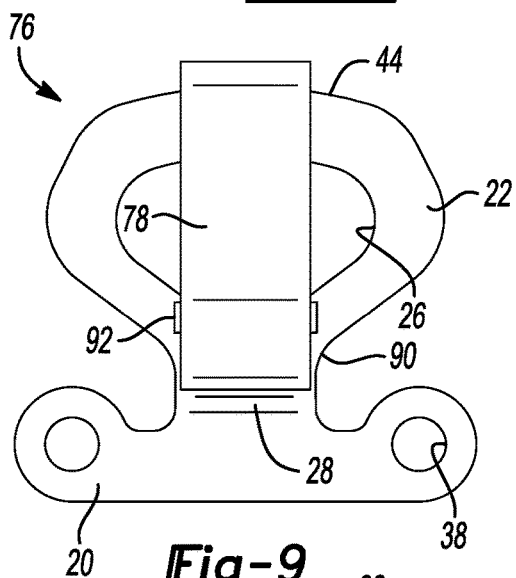
FIG. 9 is a front elevation view of a fourth embodiment of a tie-down apparatus including a cleat and a clamping jaw with teeth for engaging a rope.
Figure 11:
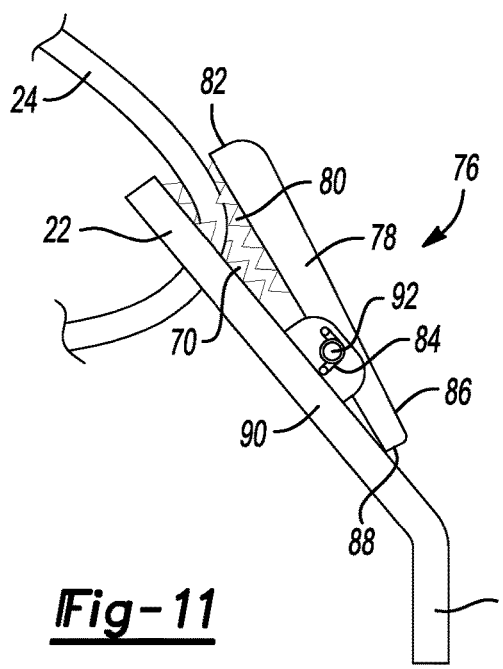
FIG. 11 is a side elevation view of the tie-down assembly shown in FIG. 9 in an open position with a rope being engaged between the cleat and the clamping jaw.
Figure 10:
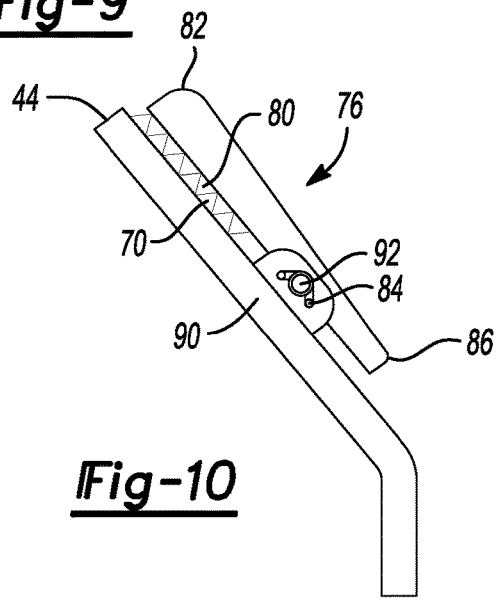
FIG. 10 is a side elevation view of the tie-down assembly shown in FIG. 9 in a closed position.

Referring to FIGS. 9-11, another alternative embodiment 76 is disclosed that includes a clamping jaw 78. The clamping jaw 78 includes a second plurality of teeth 80 that cooperate with teeth 56 provided on the loop portion 22. The loop portion 22 includes teeth 70 as described with reference to FIGS. 7 and 8 above. The clamping jaw 78 includes an openable end 82 that is opened to receive the strand 24 between the teeth 70 and the second plurality of teeth 80. A spring 84 is provided to bias the openable end 82 of the clamping jaw 78 in its closed position. A trigger 86 is provided on the opposite end 88 from the clamping jaw 78. The trigger 86 is depressed to open the clamping jaw 78. The neck portion 28 is again provided between the base portion 20 and the loop portion 22. The clamping jaw 78 is connected to the neck portion 90 of the loop portion 22 by a pivot pin 92. The spring 84 is preferably secured to the loop portion 22 to exert the biasing force about the axis of the pivot pin 92. In the embodiment shown in FIGS. 9-11, the rope or strand 24 is pulled through the opening 26. The clamping jaw 78 is opened by depressing the trigger 86 and the strand 24 is routed between the teeth 70 and second set of teeth 80. The clamping jaw 78 locks the strand 24 that is engaged on opposite sides by the teeth 70 and second set of teeth 80.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A tie-down apparatus for pick-up truck bed comprising:
    a cleat including a base portion adapted to be attached to the pick-up truck bed, a loop portion extending from the base portion and away from the pick-up truck bed to a distal end of the loop portion, the loop portion defining an opening for receiving an elongated strand threaded through the opening, and a hook-shaped flange attached to and extending from the distal end of the loop portion, the hook-shaped flange has a first portion extending away from the loop portion and a second portion overlying and spaced from the loop portion, wherein the loop portion, the first portion and the second portion together define a bight for receiving the elongated strand.

2. The tie-down apparatus of claim 1 wherein the base portion defines a plurality of fastener receiving holes in a planar area of the base portion that includes a mounting surface that is adapted to be mounted flush to one of a wall and floor of the pick-up truck bed.

3. The tie-down apparatus of claim 1 wherein the loop portion extends at an oblique angle relative to the base portion and is spaced at a distal end from the pick-up truck bed when the apparatus is attached to the pick-up truck bed.

4. The tie-down apparatus of claim 1 wherein the hook-shaped flange defines an open end through which an intermediate section of the elongated strand is receivable perpendicularly relative to a length of the elongated strand.

5. The tie-down apparatus of claim 1 further comprising:
    a neck portion disposed between the base portion and the loop portion that is adapted to be wrapped by the elongated strand instead of threading the strand through the opening in the loop portion.

\* \* \* \* \*